E. POSSON.

CAR ROOF FRAMEWORK.

APPLICATION FILED AUG. 26, 1911.

Reissued Oct. 3, 1911.

13,297.

3 SHEETS—SHEET 1.

Witnesses:
John Enders
Edythe M. Anderson

Inventor:
Edward Posson,
by Sheridan, Wilkinson, Scott & Richmond
Attys.

E. POSSON.
CAR ROOF FRAMEWORK.
APPLICATION FILED AUG. 26, 1911.
Reissued Oct. 3, 1911.
13,297.
3 SHEETS—SHEET 2.
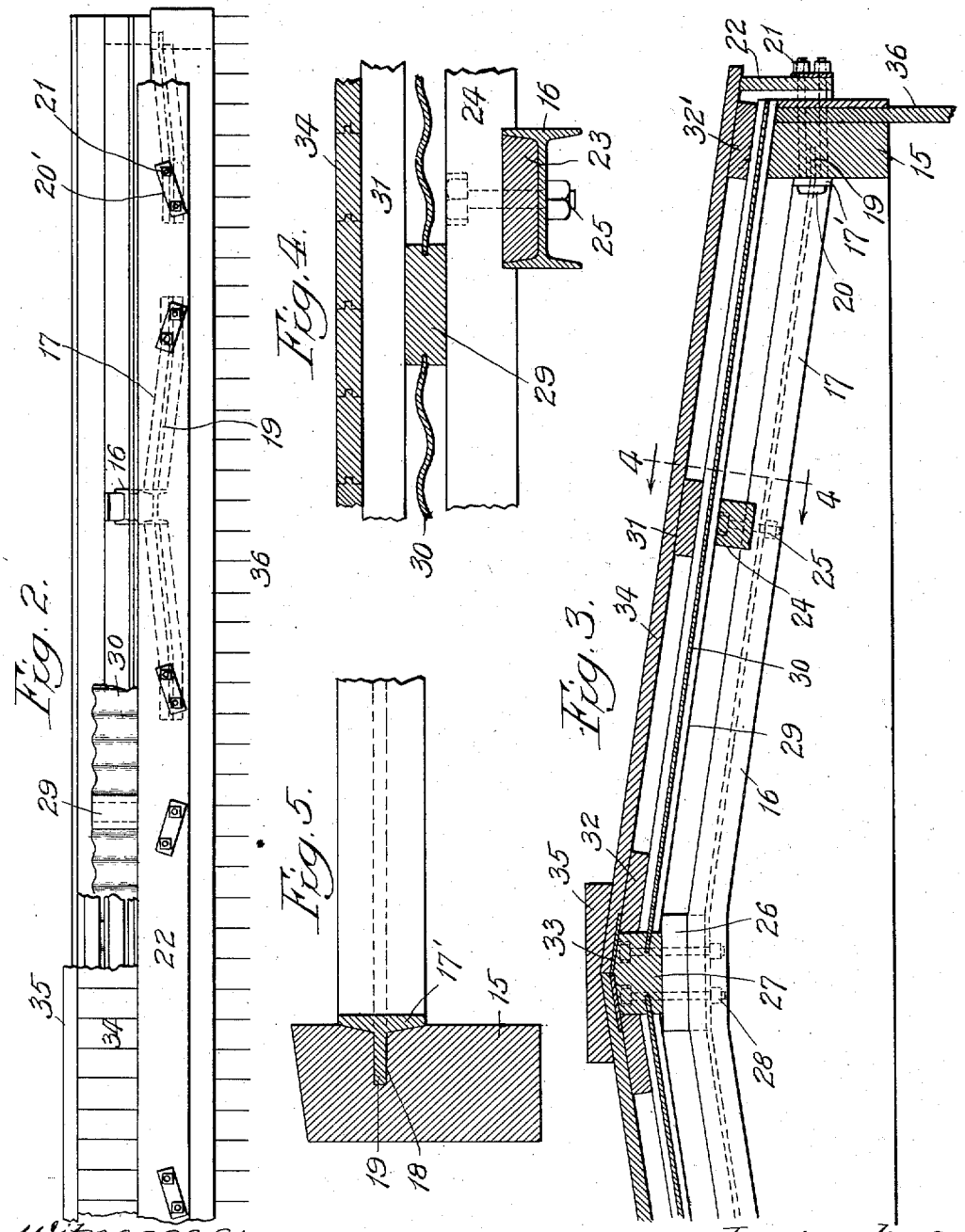
Witnesses:
John Enders
Edythe W. Anderson
Inventor:
Edward Posson,
by Sheridan, Wilkinson, Scott & Richmond
Attys.

E. POSSON.

CAR ROOF FRAMEWORK.

APPLICATION FILED AUG. 26, 1911.

Reissued Oct. 3, 1911. 13,297.

3 SHEETS—SHEET 3.

Witnesses:

John Enders

Edythe M. Anderson.

Inventor:

Edward Posson, by Sheridan, Wickinson, Scott & Richmond

Attys.

UNITED STATES PATENT OFFICE.

EDWARD POSSON, OF CHICAGO, ILLINOIS.

CAR-ROOF FRAMEWORK.

13,297. Specification of Reissued Letters Patent. Reissued Oct. 3, 1911.

Original No. 955,544, dated April 19, 1910, Serial No. 489,859. Application for reissue filed August 26, 1911. Serial No. 646,280.

*To all whom it may concern:*

Be it known that I, EDWARD POSSON, a citizen of the United States, residing at Chicago, in the county of Cook and State of Illinois, have invented certain new and useful Improvements in Car-Roof Framework, of which the following is a specification.

The principal object of my invention is to provide a new and improved framework for car roofs.

Another object of my invention is to provide a car roof framework that shall be especially adapted to resist diagonal strains.

Another object is to provide a carline that shall brace the roof against diagonal strains and shall also support the weight of the roof advantageously.

Still further objects of my invention are to provide a car roof framework that shall be simple to construct, inexpensive, durable and efficient.

All these objects and others of detail in connection therewith will be made more readily apparent in the following specification and claims when taken in connection with the accompanying drawings.

With these objects in view, my invention consists of the combination of elements stated in the appended claims, but for the purposes of explanation, I have illustrated the preferred embodiment of my invention in the accompanying drawings, together with some modifications of details.

Figure 1:
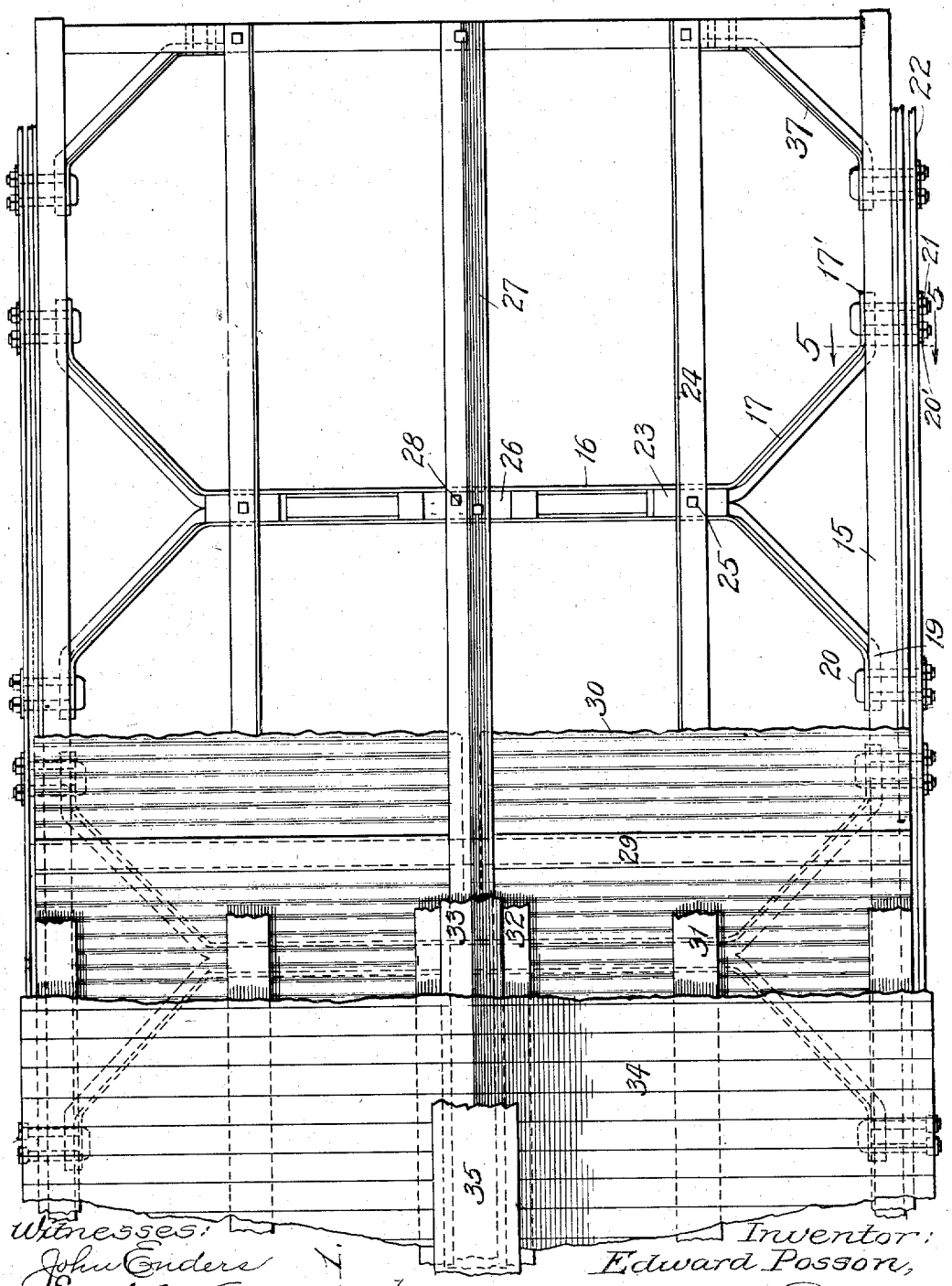
Figure 5A:
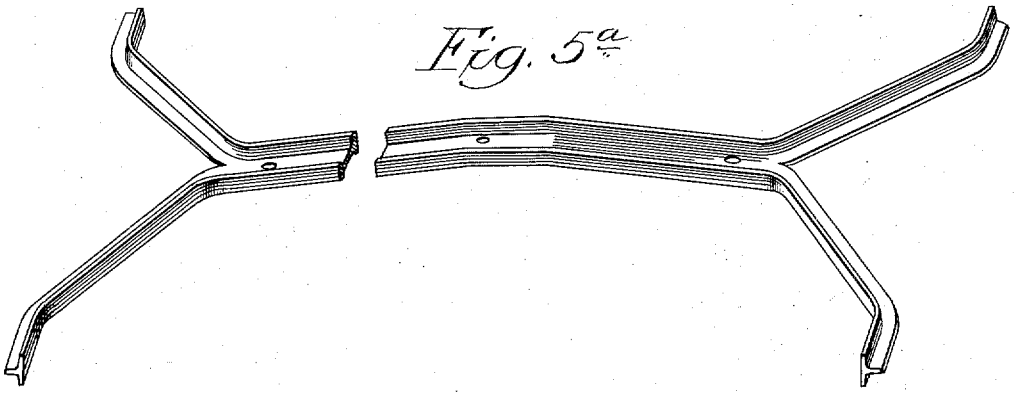

Referring to these drawings,—Figure 1 is a top plan view of my roof framework showing the roof partly broken away. Fig. 2 is a corresponding side elevation. Fig. 3 is a transverse section of the roof. Fig. 4 is a section on the line 4—4 of Fig. 3, this section being on an enlarged scale. Fig. 5 is a section on the line 5—5 in Fig. 1, this section being on an enlarged scale. Figs. 5[a], 6 and 7 are perspective views of slightly different forms of carlines that may be used in my improved roof framework.

The usual plates at the top of the side walls 36 are indicated by the reference numeral 15.

Figure 6:
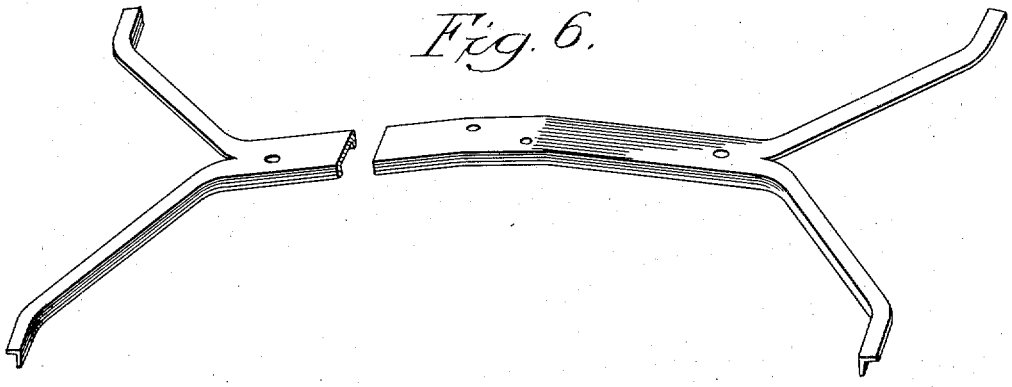
Figure 7:
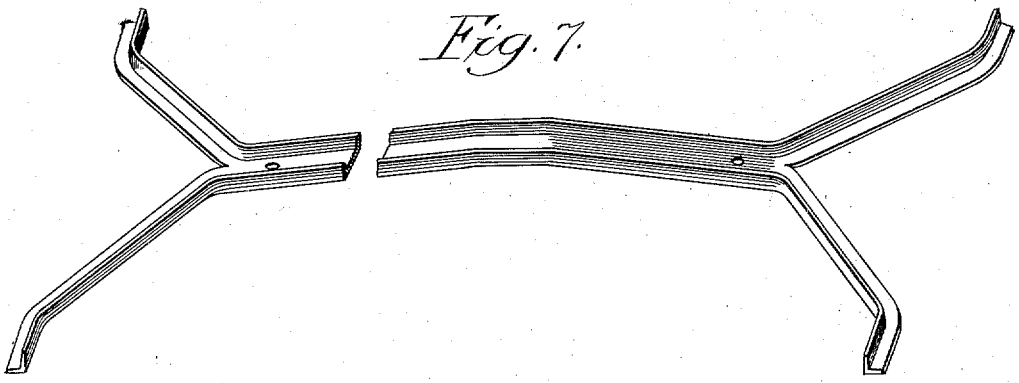

Each carline consists of an I-beam 16 or other structural shape as shown in Figs. 5, 6 and 7. I will describe my invention for the I-beam, but it will be readily apparent that various other forms of carlines would fall within the scope of the invention as defined in the appended claims.

The web of the I-beam 16 is split in toward the center part away from the ends and then the ends are spread apart at an angle to one another and to the main part of the beam or carline. The extremities 17′ of the forked ends 17 are bent still farther apart until they lie in the same plane. Channels 18 are rabbeted in the plates 15 to receive the half webs 19 of the extremities 17′ of the carlines. Holes are made through the flanges on each side of the half web 19 and a yoke bolt 20 passes through these holes, thus binding the extremities of the carline to the plate 15 and the facia 22. The nuts 21 clamp over the plate 20′ which lies against the facia 22.

Within the channel of the I-beam carline 16 are laid the blocks 23 and on top of these are the purlins 24 fastened to the carlines by means of the bolts 25. At the center of each carline is another block 26 lying in the channel of the I-beam and on this rests the ridge beam 27, the parts being fastened together by means of the bolts 28. The super-carlines 29 are placed on top of the purlins 24 and the plates 15, and their upper ends are dove-tailed into the ridge beam 27. The lateral edges of the super-carlines 29 are grooved as shown in Fig. 4 to receive the lateral edges of the corrugated roof sheets 30. Other grooves are formed in the ridge beam 27 to receive the upper or inner edges of the roof sheets 30. Above the roof sheets 30 resting on the super-carlines 29 are the super-purlins 31, the supplementary ridge members 32 and the supplementary plates 32′. The ridge beam is overhung by a sheet metal plate 33. On top of the super-purlins 31 and the supplementary members 32 and 32′ are the roof boards 34. Above these along the ridge is the running board 35. At the corners the car framework is braced with diagonal braces 37.

As will be seen on referring to Figs. 6 and 7, the carlines may have a channel or U-section with the web either up or down.

It will be noted that, as clearly shown in Figs. 2, 3, 5[a], 6 and 7, the carlines have an arched form, sloping downwardly from the central part of the car toward the sides thereof thus giving the roof structure the necessary resistance to vertical stresses resulting from the weight of the roof and service strains. The outwardly diverging ends of the carlines afford a wide support which has the effect of preventing the carlines from being tilted longitudinally of the car around the chords of the arches as centers, and the diverging ends also serve in connection with the car sides to which they are secured to form an approximately horizontal truss capable of resisting high torsional stresses. The efficiency of this truss in resisting horizontal stresses is largely dependent upon its being firmly held in its original approximately horizontal plane, and the arched carlines seated upon the wide bases formed by their bifurcated ends serve to give the truss the vertical rigidity necessary to preserve its original form.

Various other modifications falling within the scope of the appended claims are comprehended within my invention.

The diagonal portions 17 at the ends of the carlines serve to brace the roof against diagonal strains. At the same time these diagonal parts 17 perform the usual load sustaining functions of the whole carline. In practice, I have found that this carline is unusually strong and rigid in proportion to the amount of material employed therein, and a roof framework comprising such carlines has great durability.

It will be readily understood that my roof framework is adapted for all kinds of roofs, although I have illustrated it in combination with a metal roof inside of the board roof.

I claim:

1. A carline consisting of a flanged beam having the web split in from the ends, and the end parts spread at an angle to each other.

2. A carline consisting of a flanged beam having the web split in from the ends and the end parts spread diagonally apart, and the extremities of the end parts spread still farther so as to lie in the same plane.

3. In a car framework, plates, carlines, each carline consisting of a flanged beam, the web thereof being split in from the ends and the end parts spread apart and bolted to the plates, purlins and a ridge beam supported by the carlines, and a roof resting on said purlins.

4. In a car framework, plates, carlines, each carline consisting of a flanged beam, the web thereof being split in from the ends and the end parts spread apart and bolted to the plates, filler blocks lying above the web of the carline between the flanges thereof, purlins and a ridge beam resting on said blocks, and a roof supported by said purlins and ridge beam.

5. A carline consisting of an I-beam having its web split in from the ends and the end parts spread at an angle to each other.

6. In a car framework, carlines, each consisting of a flanged beam having forked ends spread apart, filler blocks lying between the flanges of the carlines, purlins resting on said blocks, and a roof supported by said purlins.

7. In a railroad car, side walls and metal carlines extending completely across the car and secured to and supported solely upon said side walls, thus affording an unobstructed space beneath said carlines, each of said carlines having an arched form and sloping downwardly from the central part of the car toward the sides thereof and the end parts of said carlines being bifurcated, the bifurcated end parts diverging toward the car sides, whereby the arches formed by the carlines are braced against tilting longitudinally of the car and whereby the entire structure forms an approximately horizontal truss.

8. A carline consisting of a flanged beam upwardly arched at its central part and split in from the ends, and the end parts spread at an angle to each other.

In testimony whereof, I have subscribed my name.

EDWARD POSSON.

Witnesses:
WALTER A. SCOTT,
EDYTHE M. ANDERSON.